US012529432B2

(12) United States Patent
Orban et al.

(10) Patent No.: US 12,529,432 B2
(45) Date of Patent: Jan. 20, 2026

(54) PRESSURE ACTIVATED FLOW BALANCING DOUBLE QUAD VALVE

(71) Applicant: A.O. International II, Inc, Stafford, TX (US)

(72) Inventors: Andre Orban, Sugar Land, TX (US); Daniel Maurice Lerner, Missouri City, TX (US); Andrew Lerner, Houston, TX (US); Ranjit K. Singh, Houston, TX (US)

(73) Assignee: A.O. International II, Inc., Stafford, TX (US)

( * ) Notice: Subject to any disclaimer, the term of this patent is extended or adjusted under 35 U.S.C. 154(b) by 0 days.

(21) Appl. No.: 18/980,840

(22) Filed: Dec. 13, 2024

(65) Prior Publication Data

US 2025/0198525 A1 Jun. 19, 2025

Related U.S. Application Data

(60) Provisional application No. 63/610,278, filed on Dec. 14, 2023.

(51) Int. Cl.
*F16K 17/04* (2006.01)

(52) U.S. Cl.
CPC ...... *F16K 17/0473* (2013.01); *F16K 17/0406* (2013.01)

(58) Field of Classification Search
CPC ............. F16K 17/0406; F16K 17/0473; Y10T 137/7845; Y10T 137/2668; Y10T 137/2663; Y10T 17/0473
See application file for complete search history.

(56) References Cited

U.S. PATENT DOCUMENTS

| | | | | |
|---|---|---|---|---|
| 585,084 | A | 6/1897 | Cook | |
| 2,634,743 | A | 4/1953 | Audemar | |
| 2,774,369 | A | 12/1956 | Di Tirro | |
| 4,054,327 | A * | 10/1977 | Rebenstorf | B60T 11/326 137/118.06 |
| 10,598,193 | B2 | 3/2020 | Lerner et al. | |
| 10,871,174 | B2 | 12/2020 | Lerner et al. | |
| 11,326,626 | B2 | 5/2022 | Lerner et al. | |
| 11,614,099 | B2 | 3/2023 | Lerner et al. | |
| 2004/0006981 | A1 * | 1/2004 | Dong | F16H 61/461 60/464 |

(Continued)

OTHER PUBLICATIONS

Technical Hydraulic Handbook, 12 edition. Section G, 1-45. The Lee Company Technical Center. Westbrook, Connecticut, USA. 2018.

(Continued)

*Primary Examiner* — Nathaniel E Wiehe
*Assistant Examiner* — Daniel S Collins
(74) *Attorney, Agent, or Firm* — ePatentManager.com; Guerry L. Grune

(57) ABSTRACT

A double quad valve design and associated use and system is presented that provides a user to control directional, bidirectional and in some cases tri-directional balanced flow into and out of three (or more) ports that together with one or more sets of springs and sliding seats ensures an ability to allow for a completely static condition that is absent any fluid or fluid flow leaks as well as completely balanced flow that eliminates hydraulic seizure during the operation of one or more mechanical, hydraulic, electro-mechanical, and/or electro-hydraulic devices.

14 Claims, 9 Drawing Sheets

(56) References Cited

U.S. PATENT DOCUMENTS

2010/0032036 A1 2/2010 Quendt et al.

OTHER PUBLICATIONS

Nargasi, Ayelet, International Search Report. Israel Patent Office. ISA/ILPO. Form PCT/ISA/210. Box C. Mar. 24, 2025, Jerusalem, Israel.
Nargasi, Ayelet, Written Opinion of the International Searching Authority. Israel Patent Office.. ISA/ILPO. Form PCT/ISA/237, Mar. 24, 2025, Jerusalem, Israel.

* cited by examiner

PRESSURE ACTIVATED FLOW BALANCING DOUBLE QUAD VALVE

PRIORITY

This application is a non-provisional conversion of and claims priority under 35 USC 119 from Provisional Application 63/612,278 filed Dec. 14, 2023 and entitled "Pressure Activated Flow Balancing Double Quad Valve", the entire contents of which are hereby incorporated by reference.

DESCRIPTION

The present disclosure describes a double quad valve design and associated use and system that provides a user to control unidirectional, bidirectional, and in some cases tri-directional balanced flow into and out of three (or more) ports that together with one or more sets of springs and sliding seats ensures an ability to allow for a completely static condition that is absent any fluid or fluid flow leaks.

BACKGROUND

The present disclosure generally relates to systems and methods that include powered units (power units—PUs, and most often hydraulic power units—HPUs) designed for operating "prime movers". These systems utilize devices that move by receiving hydraulic and/or electric power and are primarily associated with pipelines. Although the prime movers described herein in detail have been designed specifically for downhole petrochemical well applications, the assemblies and associated valve operation and engagement with actuated hydraulic cylinders and pistons pose opportunities for optimizing the actuation and efficiencies in other applications. These applications include other technology fields involving; energy generation, distribution, and storage, including cogeneration, hydraulic power systems, air and water reclamation systems, as well as transportation systems including civilian and military automobiles, aircraft, and boats/ships. The valve operations for the "prime movers", in the past has focused on the use of selective bi-directional hydraulic/electric power unit (HPU's) where the hydraulic fluids can be air, gas, or liquid. It is desirable to combine the functionality of these selective bidirectional valves and valve arrangements into a singular valve design that accomplishes identical or nearly identical and improved functionality.

The ability to provide one or more devices for optimizing bi-directional movement of (mostly) mechanical devices including pistons, motors, pumps, gears, valves, packers, as well as other mechanical devices that require automated movement as required using compression and/or expansion of fluids such as air, gas or hydraulic fluids are described herein. The valve(s) can be powered by hydraulic power, electrical power, or a combination of both. Unbalanced flow has been an historical issue for any sealed system that is required to move fluid in either a singular or bidirectional manner. The primary reason this problem has existed is because the fluid moving system will often experience hydraulic lock when a different amount of flow going into the prime mover (such as a pump/motor) versus the flow that is being sent out of the prime mover is required. This "unbalanced flow requirement" is often impossible to balance within a flow control system leading to one purpose of the present disclosure.

A common desirable application for utilizing a prime mover to move a hydraulic system is to connect the prime mover inlet to an inlet port side of a hydraulic cylinder and connect the outlet side of the prime mover to the outlet port side of the hydraulic cylinder. The requisite action is that during operation, the prime mover pushes fluid out of the prime mover cavity and into an inlet port side of the hydraulic cylinder, thereby moving a piston or other moving parts of the hydraulic cylinder. The fluid returning from the other port of the hydraulic cylinder returns to the prime mover cavity on the inlet side of the prime mover. Unfortunately, this action often creates hydraulic lock within the prime mover because commonly known and historically implemented hydraulic system designs require differing volumetric amounts of fluid on the supply and return sides of any hydraulic operation. For example, the amount of fluid required on an inlet side of a hydraulic cylinder is different than the amount of fluid returning from the outlet side of the hydraulic cylinder per unit distance of the travel of the piston or other moving parts within the hydraulic cylinder.

The cause of the different (also known as "unbalanced fluid volume and unbalanced fluid flow") volumetric amounts of fluid is based upon the fact that the cross-sectional area of the full piston bore hole and piston compared with the piston and rod combination within the full piston bore hole on both sides of the hydraulic cylinder are different. Specifically, the effective cross-sectional area on one side of the cylinder is the fullbore diameter of the hydraulic piston bore, whereas the effective cross-sectional area on the other side of the cylinder is the cross-sectional area of the full piston bore minus the cross-sectional area of the piston rod operating inside the full piston bore. If the cross-sectional areas and resulting volumes are not exactly equal, the fluid will cause hydraulic locking of the prime mover due to the fact that the fluid is primarily incompressible. Most pumps acting as prime movers operate in a fashion that provides the ability to move the same amount of fluid into and out of the pumps' cavity. This eventually results in causing rapid pressure changes due to fluid flow imbalances within the hydraulic system thereby leading to hydraulic lock.

The fundamental prime mover arrangement, such as a pump and cylinder, is unusable for sealed systems where the function required is a controlled and precise unidirectional and/or bi-directional motion within the cylinder. Often systems are employed in which common industrial processes have a variable reservoir capacity included in some location within the hydraulic circuit to ensure performance of this function.

In the case of sealed systems (especially for downhole oil and gas exploration, the automotive and aerospace industries, and in general) it is desirable to provide a solution to this problem by using other than a (relatively large) variable reservoir. The variable reservoir is a term that describes the variability of the volume of fluid in the reservoir at any point in time. The increasing pressure caused by the increase of the reservoir pressure on the HPU pump increased mechanical force on the inside of the HPU pump elements, and damaged bearings were found as a result causing the HPU pump to no longer perform properly. In addition, for certain functionality in microfluidic applications, there exists a cracking pressure which is the pressure required to begin lifting the ball off the seat of a ball check valve thus allowing the fluid through the valve to move in the forward direction so that it is possible to control the cracking pressure depending on the spring force. As the spring force and the cracking pressure are increased, the same valve now functions and is also actually known as a pressure relief valve. For the present disclosure it is emphasized that it is important not to allow the pressure to reach a pressure that could harm the mechanical components or exceeding the ultimate yield pressure of the materials used to fabricate the double valve or other valves used in downhole arrangements and/or associated pump described herein. For the present disclosure the double quad valve design that has been developed to date is about one quarter of an inch in diameter and thinner than the diameter of a commonly used no. 2 pencil (5-7 mm) with not much more than an inch long body.

SUMMARY

It is preferable to simplify the prime mover arrangement by utilizing a bi-directional power unit such as one or more single valves that reduce or eliminate the need for piping, pressure regulators, solenoids, and other valves as well as the additional plumbing required for conventional systems. This is possible by providing a double quad valve together with a reservoir flow balancing compensator technique for primarily sealed systems, which is described in detail below. The nomenclature for one such embodiment is a prime mover system and method utilizing double quad valve bidirectional hydraulic valve(s) and fluid reservoir balancing devices that minimizes the size of the variable reservoir.

More specifically, the double quad valve balances fluid flow as it actuates and moves one or more mechanical, hydraulic, electro-mechanical, and/or electro-hydraulic devices, wherein the double quad valve manages and controls the fluid flow so that the fluid flow flows in a single or bi-directional and/or tri directional direction as required, and wherein the double quad valve possesses at least three ports and is connected to a fluid reservoir;

(i) a first port of the three ports is located on an inlet side of the double quad valve, (ii) a second port is located on an outlet side of the double quad valve and;

(iii) a third of the three ports is located between the inlet side and the outlet side of the double quad valve such that the third port connects to a reservoir between the first port and second port and;

wherein said fluid flow is controlled when fluid flows though said double quad valve by use of at least one set of three ports wherein the double quad valve further comprises; at least three springs and two moving seats that provide for complete and absolute closure and sealing of all ports of the double quad valve by modification of the moving seats into sliding seats that allow for seating in outer positions of the double quad valve so that the sliding seats can rest on sliding seat outer stops and wherein both the first port and the second port includes at least one or more check elements that are seated and rest on the sliding seats wherein the one or more check elements are controlled by pressure relief springs such that the first port also is equipped with a pressure relief spring that allows for push of the first port check element so that the sliding seat is pushed toward a right direction in order to just come in contact with a first port sliding seat and wherein the second port also is equipped with a pressure relief spring that allows for push by the second port check element so that the sliding seat is pushed toward a left direction to just come in contact with a second port sliding seat so that the sliding seats just come in contact in a position that provides a force necessary to push both sliding seats far enough to just contact a set of inner stops so that when the double quad valve is in a static fluid normal/neutral state and associated position provided by a third pressure relief spring that pushes the sliding seats away from each other to contact sliding seat outer stops so that a middle portion of the double quad valve that can function as a fluid reservoir thereby ensuring a complete absence of fluid flow that can flow between any of the three ports.

In this arrangement, to achieve the complete absence of fluid flow seated check elements that can be in the form of spherical balls maintain a position in coordination with the sliding seats outer stops and wherein a balanced pressure spring that resides in a middle portion of the double quad valve provides a spring K factor of at least twice that of two pressure relief check springs that exist within ports of both the inlet side and the outlet side.

Here, the balanced pressure spring pushes the sliding seats toward the sliding seats outer stops that results in pushing a first port sliding seat as far to a left position as possible due to geometric mechanical constraints of the double quad valve and a second port sliding seat to as far to a right position as possible due to the geometric mechanical constraints of the double quad valve.

It is also possible that the double quad valve design will function as a reverse pressure relief valve wherein reverse pressure relief occurs via movement of the sliding seats and wherein as two cross pressure release tips connected to the sliding seats are pushed together only if and when the sliding seats are in motion.

In this case the double quad valve includes a reservoir and/or a well is depressurized when the sliding seats are set in motion toward each other.

In this and other embodiments the double quad valve controls fluid flow into and out of at least one fluid reservoir.

Here the at least one fluid reservoir is vented, sealed, pressure compensated, preloaded and/or expandable.

In this and other embodiments, the inlet and the outlet port(s) open and close as required to ensure balanced fluid flow along the flow path with a required force and direction to move the mechanical, hydraulic, electro-mechanical, and/or electro-hydraulic device(s) actuated by an actuator in a precise and controlled manner as needed.

The double quad valve provides an ability for fluid to be delivered to at least one port of the actuator via an hydraulic circuit and fluid flow along the flow path from one or more pumps located on either or both sides of the inlet and outlet port(s) is blocked, redirected, or continues to flow into one or more additional control valves, the additional control valves include components that control fluid flow returning from the actuator back into the one or more pumps, thereby completing a flow of fluid along the flow path and accomplishing an ability to control intermittent or continuous movement of the mechanical, hydraulic, electro-mechanical, and/or electro-hydraulic devices.

In this and other embodiments, at least one hydraulic circuit can also be powered by electrical power that actuates and moves the one or more pumps in either a single or bi-directional direction wherein electric power units are selected from a group consisting of motors, engines, turbines and inverters.

Here the fluid flow along the flow path continues flowing into and out of the one or more pumps thereby keeping one or more motor seal ports and associated pump ports filled with fluid, thereby reducing or eliminating hydraulic lock and cavitation of the one or more pumps.

In a further embodiment, least one hydraulic circuit also includes a pressure compensator tank that is operationally connected to the at least one pump inlet port of the one or more pumps through a fluid flow filter and wherein the compensator tank is a portion of a variable fluid reservoir.

For all embodiments, the one or more pumps are a motor.

In this and other embodiments, the fluid reservoir includes at least one compensator tank and a port to ambient pressure and a reservoir pressure measuring device that measures ambient pressure and ensures an ability to operate even with an existence of unbalanced flow to and from the actuator within or adjacent to the hydraulic circuit and wherein the fluid reservoir allows for thermal expansion or compression within the system.

It is possible that all ports are closed in that any pipeline connected to the double quad valve is also completely closed and has no open ports to the atmosphere.

The double quad valve further comprises a controller to increase volume, change direction, and/or increase static or dynamic pressure within the fluid along the flow path.

In addition, the fluid reaches an upper bi-directional port of the actuator wherein the fluid is delivered to the actuator and returns from the actuator from a lower bi-directional port.

Here at least one hydraulic circuit further comprises at least one conventional check valve and the conventional check valve has two ports.

In yet another embodiment, at least one hydraulic circuit contains at least one set of pilot operated check valves wherein the pilot operated check valves have at least three ports.

It is also possible that the at least one hydraulic circuit contains at least two sets of pilot operated check valves.

Here another embodiment provides for at least one hydraulic circuit further that comprises a detented shuttle valve with at least three ports.

In at least this embodiment, a pipeline connected to the double quad valve has at least one fluid flow filter.

In all embodiments, the pipeline may have at least one pressure measuring device.

In yet another embodiment, the at least one hydraulic circuit moves the one or more pumps by using energy to move fluid in the flow path.

In a further embodiment, the least one hydraulic circuit further comprises at least one pressure measuring device for measuring pressure of flow into or out of the double quad valve, pumps, pipelines, and fluid reservoirs.

BRIEF DESCRIPTION OF THE DRAWINGS

FIG. 3 illustrates and provides exactly the same conditions as FIG. 2, except that what is described for FIG. 2 is now occurring with and for Port B [107]. In this configuration Port B [107] is being utilized to connect with an HPU (shown as Port B connected HPU [104] in FIG. 1).

FIG. 4 depicts an A>C arrangement [400] where there is pressure from the reservoir, that is coming into the Port C [195], which is lower than Port A [105]. This condition could potentially occur with a decrease in the hydrostatic pressure, which is on the entire system during normal downhole valve operations including the double quad valve.

DETAILED DESCRIPTION OF THE DRAWINGS

Figure 1:
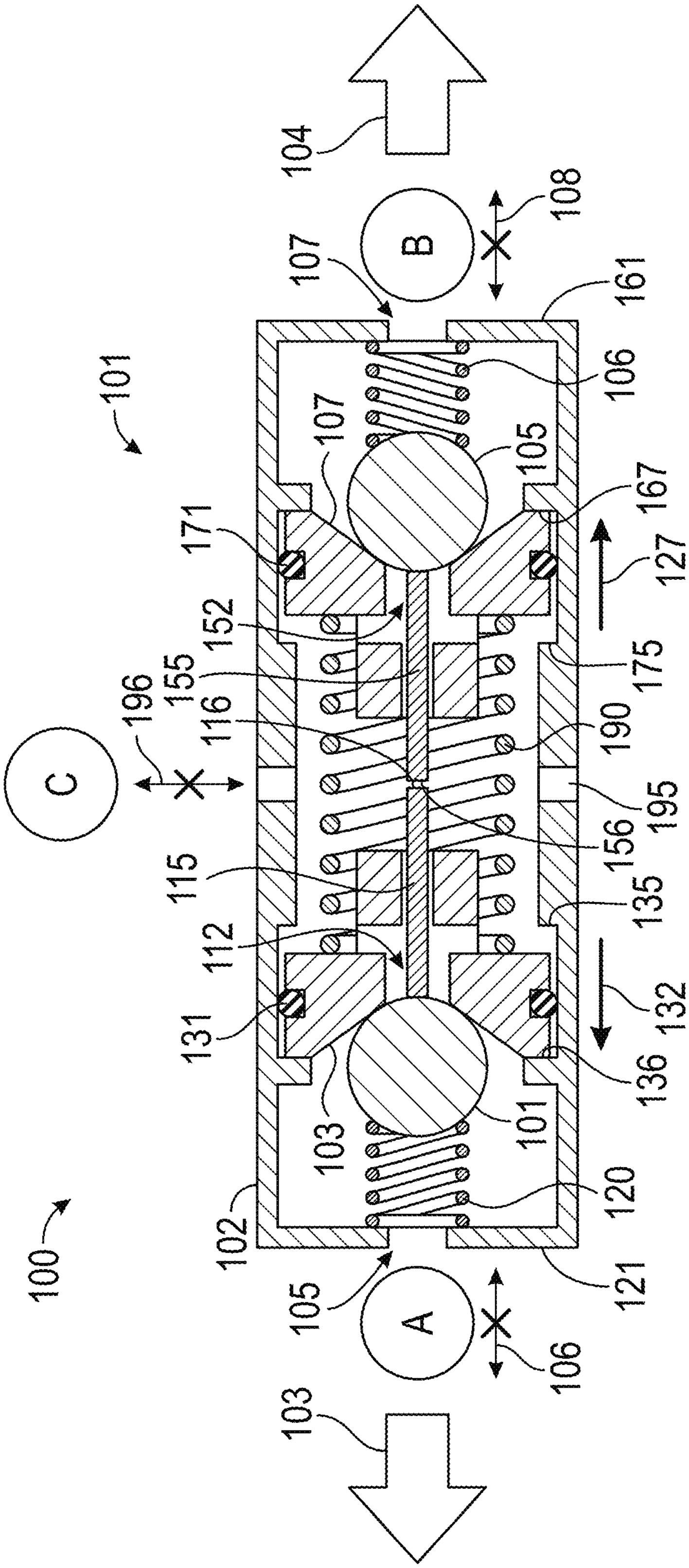
FIG. 1 is a fully detailed schematic of the double quad valve in the static, absolute closed, normal and/or neutral position.

As shown in FIG. 1, the double quad valve [100], is an eight-way flow balancing valve assembly, housed in a valve body [102], that is a combination valve which includes packaging a number of multifunctional components. The double quad valve [100] shown has been condensed into a compact space which is important for downhole oil and gas exploration applications.

A very important distinction between this double quad valve [100] and the flow balancing valve of U.S. Pat. Nos. 10,598,193, 10,871,174, and 11,326,626, occurs when all the ports are in an "everything closed" position but it is not possible. This new functional position provided by the double quad valve [100] allows for an "everything closed" position and serves to overcome significant issues associated with the original shuttle valve design in that the shuttle valve design does not always reach the "everything closed" position correctly or completely. This is a common and troublesome issue for micro hydraulic devices and operations where the fluid is pumping so slowly, with such a small volume of flow, that there is not enough fluid flow to allow removal of normally required valve elements that are provided so that the valve elements close and stop fluid from leaking from the pumps and pump outlet.

More specifically, for instance if fluid is being pumped from Port A [105] so that the process is building pressure on Port A, as described in the previous U.S. Pat. Nos. 10,598,193, 10,871,174 and 11,326,626, the inverse shuttle valve required that there be enough fluid flow moving from Port A to through the valve elements into Port B or Port C. If this condition did not occur, it is possible that there was not enough fluid volume to make the inverse shuttle check valve ball element move. This is due to the fact that the ball element in the previous designs did not incorporate a spring element. In the previous U.S. Pat. Nos. 10,598,193, 10,871,174 and 11,326,626 there are no springs or spring elements in the shuttle valve(s) design. Therefore, previous designs did not provide a fully defined "normal/neutral" position. Without enough fluid the check valve ball element might not move fully into the seat. Therefore, the possibility of ensuring that the pressurized Port A [105] and/or Port B [107] do not reach an absolute closed position is possible.

In FIG. 1, in order to understand the importance of the double quad valve [100], it is very important to understand the absolute closed position of this valve in complete detail. The double quad valve has three springs and two moving seats that slide and that include check elements, which depending on their position within the sliding seats control fluid flow. These are new and necessary features that were previously not understood or known. With the valve in the "normal/neutral" position, there is a complete absence of fluid flow between any of the ports [105, 107, 195]. This means that all of the ports [105(A), 107(B), 195(C)] are completely and absolutely sealed (closed), and the Port A sliding seat [130] and Port B sliding seat [170] are seated in outer positions shown by the Port A positioning arrow [132] and Port B positioning arrow [172] that indicate the position of the Port A and Port B sliding seats [130, 170] that rest on the Port A sliding seat outer stop [136] and Port B sliding seat outer stop [176].

In order for the double quad valve [100] to be completely and absolutely sealed, the Port A sliding seat seal [131] and Port B sliding seat seal [171] are positioned (top and bottom), respectively, within the Port A sliding seat [130] and the Port B sliding seat [170] allowing for reduced friction of the sliding seats' [130, 170] movement, while preventing leakage from both Port A [105] and Port B [107].

In order to achieve the absolutely sealed (closed) position using Port A and Port B check elements [110, 150] it is possible to maintain the position of Port A and Port B sliding seats [130, 170] at the Port A and Port B sliding seat outer stops [136, 176]. It is critical that the balanced pressure spring [190] provides a 2× to 3× higher K-factor than the two pressure check release springs, termed Port A pressure check release spring [120] (affixed to the Port A pressure release check spring support [121]) and Port B pressure check release spring [160] (affixed to the Port B pressure release check spring support [161]). The balanced pressure spring [190] pushes the two sliding seats [130, 170] towards the sliding seat outer stops [136, 176]. Therefore, due to the higher K-factor, the balanced pressure spring [190] is pushing the Port A sliding seat [130] all the way to the left, while also pushing the Port B sliding seat [170] all the way to the right. The sliding seats [130, 170] cease to slide once the sliding seat outer stops [136, 176] are reached.

The static (closed, normal and/or neutral) position [101] (as provided in FIG. 1) of the double quad valve [100] is imparted because the K-factor of the balanced pressure spring [190] in the center provides more force and is pushing the sliding seats [130, 170] outward more than the weaker Port A and Port B pressure check release springs' [120, 160] forces. In this case, the weaker (lower than the force of the balanced pressure spring [190]) forces are still able to push the Port A and Port B check elements [110, 150] inward and keep Port A [105] and Port B [170] absolutely and completed sealed (closed). In the closed configuration, the Port A cross pressure release rod [115] and Port B cross pressure release rod [155] are positioned at the furthest extended distance possible from each other. Here the Port A sliding seat [130] position is indicated here by the Port A positioning arrow [132] and for the Port B sliding seat [170] the position is indicated by a Port B positioning arrow [172]. This static (or resting) position [101] is important so that when the HPU is not being utilized the hydraulic fluid is not allowed to circulate into or out of the user's device. In this manner, the user's device is allowed to remain in an undisturbed position.

Figure 2:
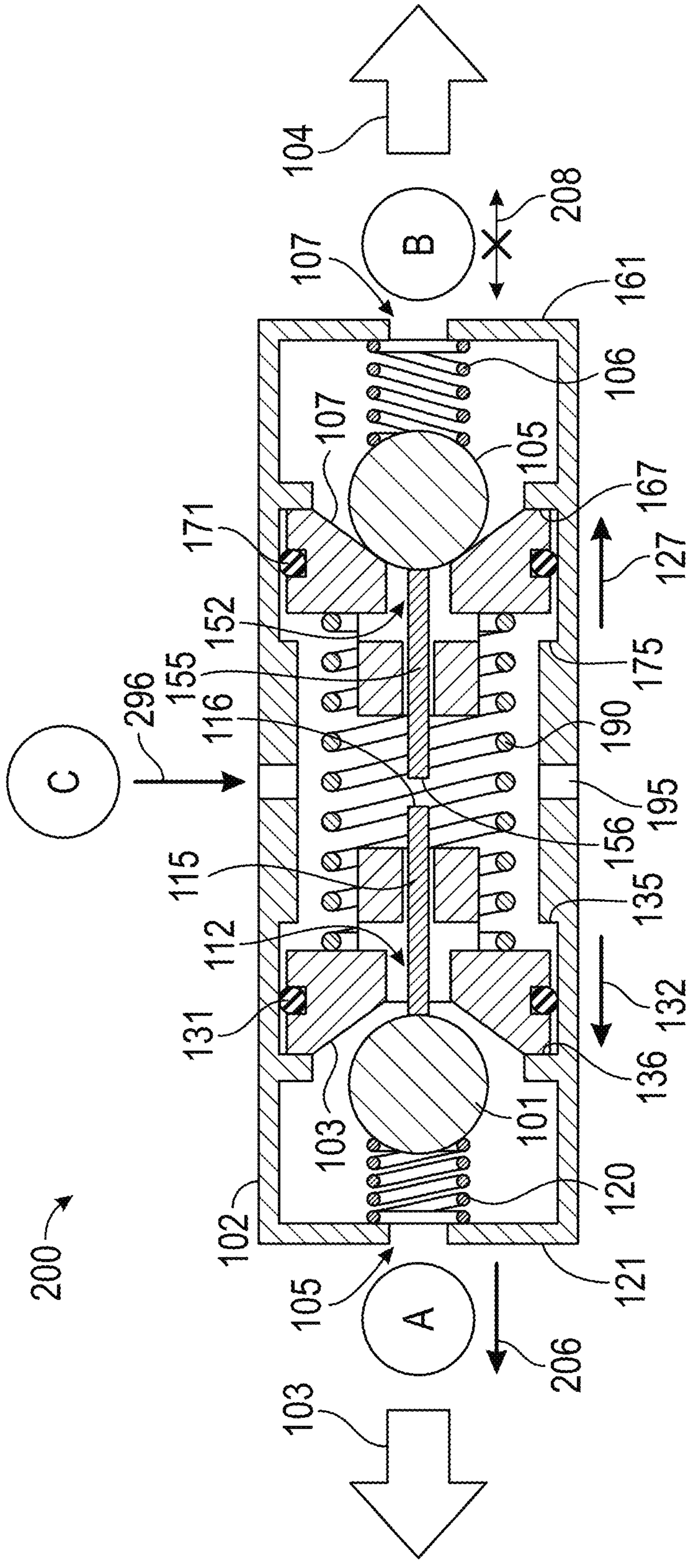
FIG. 2 is a schematic of the double quad valve where the double quad valve [100] pressure of Port C>Port A arrangement [200] to allow fluid flow to proceed in a singular direction out of Port A [105] indicated by Port A flow arrow [106]. For clarification, FIG. 2. provides the double quad valve [100] in a configuration where the pressure on Port C [195] ($P_C$) is greater than the pressure on Port A [105] ($P_A$) and $P_C>P_A$, indicating the pressure in Port C is greater than the pressure in Port A.

In FIG. 2, the double quad valve [100] C>A arrangement [200] allows for the fluid flow to proceed in a singular direction out of Port A [105] indicated by Port A flow arrow [106]. For clarification, FIG. 2. provides the double quad valve [100] in a configuration where the pressure on Port C [195] ($P_C$) is greater than the pressure on Port A [105] ($P_A$) and ($P_C > P_A$, indicating the pressure in Port C is greater than the pressure in Port A). In order for fluid to flow out of Port A, fluid must first flow into the double quad valve [100] through Port C [195], indicated by Port C flow arrow [196], where the fluid flow proceeds through Port C to Port A through Port A flow passage [112] lifting the Port A check element [110] and compressing the Port A pressure check release spring [120] therefore overcoming a pressure differential which is the pressure across the Port A check element [110]. The fluid flows out of Port A [105] to the Port A connected hydraulic power unit [103] as shown in FIG. 1. In this scenario the fluid flow entering through Port C [195] does not pass through the Port B flow passage [152] because there is insufficient differential pressure across the Port B check element [150].

FIG. 2. Illustrates the condition where the pressures inside the valve are such that the fluid flow is only flowing from Port C [195] and out of Port A [105]. No fluid is allowed to flow from Port C [195] to Port B [107] as indicated by Port B flow arrow [108]. In the C>A arrangement [200], the flow is from Port C [196] to Port A [105], and the double quad valve acts as a pressure relief check valve.

Protecting the pump from large changes in hydrostatic pressure is another important feature of the flow balancing double quad valve [100].

Utilization of the flow balancing double quad-valve [100], as shown in FIG. 2, also indicates that even though the hydrostatic pressure is increasing in Port C [195] (that is in fluid contact with the reservoir), the double quad valve [100] ensures that increasing pressure in the reservoir gets relieved through the Port A check element [110]. Here the fluid is forced out of Port A [105] and fills up whatever volume of fluid Port A [105] requires to ensure pressure equilibration.

Figure 3:
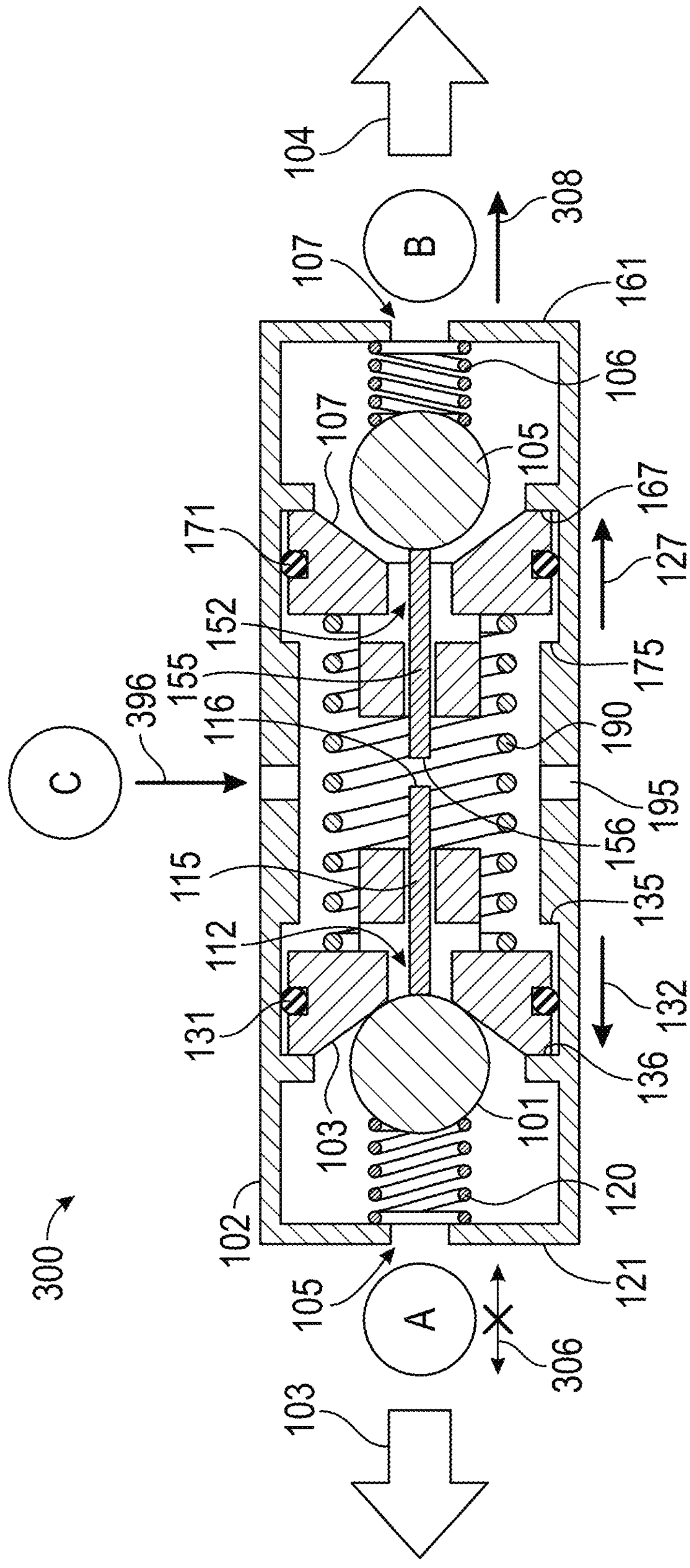
FIG. 3 is a schematic of the double quad valve where

FIG. 3 illustrates and provides exactly the same conditions as FIG. 2, except that what is described for FIG. 2 is now occurring with and for Port B [107]. For instance, in this configuration Port B [107] is being utilized to connect with an HPU (shown as Port B connected HPU [104] in FIG. 1). When the pressure at the Port C [195] increases, the pressure at Port B [107] is not increasing. The Port B check element [150] on the Port B [107] side will open and allow for excess pressure to build and therefore provide for fluid to flow into Port C to the Port B, thereby equalizing the pressure differential. In this manner, everything described for Port A [105] above now corresponds directly to Port B [107]. In FIG. 3, the operation for Port B [107] mirrors that of Port A [105].

In FIG. 3, this double quad valve [100] C>B arrangement [300] allows for the fluid flow to proceed in a singular direction out of Port B [107] as indicated by flow arrow [108]. For clarification, FIG. 3. provides the double quad valve [100] in a configuration where the pressure on Port C [195] ($P_C$) is greater than the pressure on Port B [107] ($P_B$) ($P_C > P_B$, indicating C>B). In order for fluid to flow out of the Port B [107] fluid must first flow into the double quad valve

[100] valve through Port C [195] indicated by flow arrow [196] where the fluid flow proceeds through Port C [195] to Port B [107] through the Port B flow passage [152] lifting the Port B check element [150], compressing the Port B pressure check release spring [160] therefore overcoming a pressure differential which is the pressure across the Port B check element [150]. The fluid flows out of Port B [107] to the Port B connected hydraulic power unit [104] as shown in FIG. 1. In this scenario, the fluid flow entering through Port C [195] does not pass through the Port A flow passage [112] because there is insufficient differential pressure across the Port A check element [110].

FIG. 3. illustrates the condition where the pressures inside the valve are such that the fluid flow is only flowing from Port C [195] and out of Port B [107]. No fluid is allowed to flow from Port C [195] to Port A as indicated by the Port A flow indicator [106]. In the C>B arrangement [300], flow is from Port C [196] to Port B [107], and the double quad valve acts as a pressure relief valve.

Protecting the pump from large changes in hydrostatic pressure is another important feature of the flow balancing double quad valve [100].

Utilization of the flow balancing double quad-valve [100], as shown in FIG. 3, also indicates that even though the hydrostatic pressure is increasing in Port C [195] (that is in fluid contact with the reservoir) the double quad valve [100] C>B arrangement [300] ensures that increasing pressure in the reservoir gets relieved through the Port B check element [150]. Here the fluid is forced out of Port B [107] and fills up whatever volume of fluid Port B [107] requires to ensure pressure equilibration.

There are cases where the entire well is pressured up or reduced in pressure due to operational features of an oil drilling or producing well. In the case where the pressure in the well is increasing, the pressure at Port C [195] will be increasing, and the pressures on both Port A [105] and Port B [107] will not be changing. It should be understood that the pressures are synonymous with the forces per a specific area or volume associated with each Port and/or fluid flow. By using a flow balancing valve present in this configuration, the build-up of a large pressure differential between the reservoir (where the body of the pump resides) and Port C) [195]) with Port A [105] and Port B [107] ensures that this large pressure differential does not damage any of the mechanical components of the pump. As the reservoir (which is connected to Port C [195]) is experiencing increasing pressure, the pistons will be pushing (not shown) in a certain direction, which may push the pistons against bearings or mechanical features that are inside of the HPU pump. If there is too much force, mechanical damage could occur inside of the HPU or other pumps.

Figure 4:
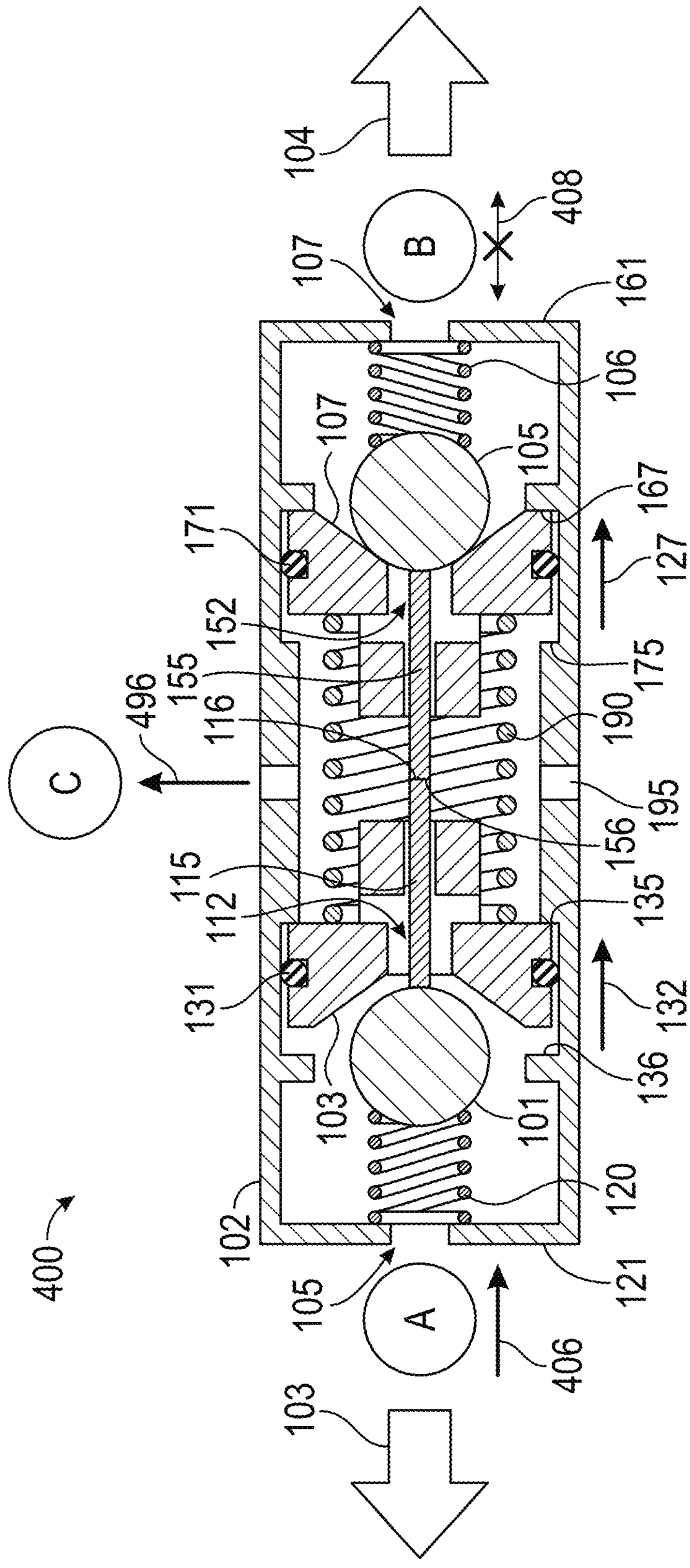
FIG. 4 is a schematic of the double quad valve where

The condition of FIG. 4 provides the case where there is pressure from the reservoir, that is coming into the Port C [195], which is lower than Port A [105]. This condition could potentially occur with a decrease in the hydrostatic pressure, which is on the entire system during normal downhole valve operations including the double quad valve. The reservoir which is connected to Port C [195], is pressure compensated, meaning that it operates at or near the pressure of the hydrostatic pressure of the well in which the double quad valve [100] is sitting.

More specifically, FIG. 4 depicts an A>C arrangement [400] when the pressure on port A is greater than the pressure on port C, and this pressure differential tends to push the sliding seat [130] toward of the center and the location of Port C [195] when the pressure of port C is decreasing. The pressure on Port A [105] is greater than the pressure on Port C [195], moving the Port A sliding seat [130] to the right to contact the Port A sliding seat inner stop [135]. In this instance, fluid flow through the Port B [107] does not exist as shown by flow indicator [108].

This feature was not possible in the original flow balancing inverse shuttle valve of U.S. Pat. Nos. 10,598,193, 10,871,174 and 11,326,626 as the mechanical feature of a sliding seat did not exist. The pressure at Port C [195] is decreasing in FIG. 4, while in FIG. 2 and FIG. 3, the pressure at Port C [195] was increasing. In this instance, the pressure of Port C [195] is decreasing because the well is depressurizing. This is a normal occurrence in wells, and when depressurizing the reservoir, the pump (hydraulic or otherwise) is also locking in the pressures on Port A [105] and Port B [107]. During this operation, the pump is not pumping, there is only a change in hydrostatic pressure that occurs when this operation takes place. In an extreme case of well depressurization, the mechanical components of the pump including the bearings and other sliding surfaces that are inside of the pump as well as additional mechanical components connected to or in the vicinity of the HPU [103,104] could be damaged. In some cases, the well (reference here to an oil and/or gas well) could be depressurized thousands of pounds, and eventually the metal parts inside and exterior to the pump can be damaged. To alleviate this potential damage the double quad valve [100] was designed to function here as a "reverse pressure relief valve", where the reverse pressure relief occurs through the movement of the sliding seat [130]. As the two cross pressure release rod tips [116, 156] are being pushed together, they can only be pushed together if the sliding seat [130] is moved towards the right, that is towards Port C. As the well is depressurized, the sliding seat [130] starts moving toward the center portion of the double quad valve [100] near the Port C [195] location.

In this instance, there is pressure on Port A [105] while the pressure on Port C [195] is decreasing. The pressure is coming from the Port A connected hydraulic power unit [103] as shown in FIG. 1. The Port A sliding seat [130] of the double quad valve [100] moves towards the center of the double quad valve [100]. The Port A and Port B check elements [110, 150] remain seated in the sliding seats [130, 170]. The amount of movement of the sliding seat [130] is controlled by the balanced pressure spring [190].

Careful adjustment of the dimensions of the double quad valve [100] is required to determine and provide how far the sliding seats [130, 170] can move versus how far apart the cross pressure release rod tips [116,156] of the cross pressure release rods [115, 155] of the two check elements [110, 150] can come together without too much or too little space being left between the cross pressure release tips [116, 156]. The length of the cross pressure release rods [115, 155] is very critical, as well as the amount of distance that the sliding seats [130, 170] are allowed to move. The Port A sliding seat [130] is only allowed to move a certain distance between the Port A sliding seat inner and outer stops [135, 136]. There is more movement available for the sliding seats [130, 170] than there is for the check elements [110, 150] because the cross pressure release rod tips [116, 156] are touching.

The cross pressure release rods [115, 155] are attached to the check elements [110, 150] in such a way that the cross pressure release rod tips [116, 156] touch before the sliding seats [130, 170] have reached the end of their travel. Therefore, as the pressure on Port C [195] is decreasing, the sliding seat [130], along with its check element, start to slide towards the middle of the double quad valve [100], compressing the balanced pressure spring [190]. At some point the cross pressure release rod tips [116, 156] touch, but the sliding seat [130] continues to slide. As the seat [130] continues to slide, it opens up the gap between the check element [110] and the sliding seat [130] and the flow, as indicated by Port A flow arrow [106], moves through the Port A flow passage [112], exiting through Port C [195] as indicated by Port C flow arrow [196]. In this instance the Port B check element [150] remains positioned against the Port B sliding seat [170], and no flow exists in Port B, as indicated by Port B flow arrow [108].

In an additional embodiment of FIG. 4, Port B [107] could be connected to Port C [195], of the double quad valve [100] maintains the proper dimensions, so that the Port A sliding seat [130] is going to continue to move and eventually touch the Port A sliding seat inner stop [135]. Because the Port A sliding seat [130] moved and now comes to a rest against the Port A sliding seat inner stop [135], the Port A check element [110] is pushed by the Port A pressure check release spring [120] moving the Port A cross pressure release rod [115] forcing the cross pressure release rod tips [116, 156] to touch each other which lifts the Port A check element [110] away from the Port A sliding seat [130]. This opens the Port A flow passage [112] to allow fluid flow into Port A [105] as indicated by Port A flow arrow [106]. Thus, fluid is flowing from Port A [105] through the double quad valve [100] and fluid flow is coming out of Port C [195] as indicated by Port C flow arrow [196].

In the A>C arrangement [400], the flow path is Port A [105] to Port C [195]), and the double quad valve acts as a pressure relief check valve.

Figure 5:
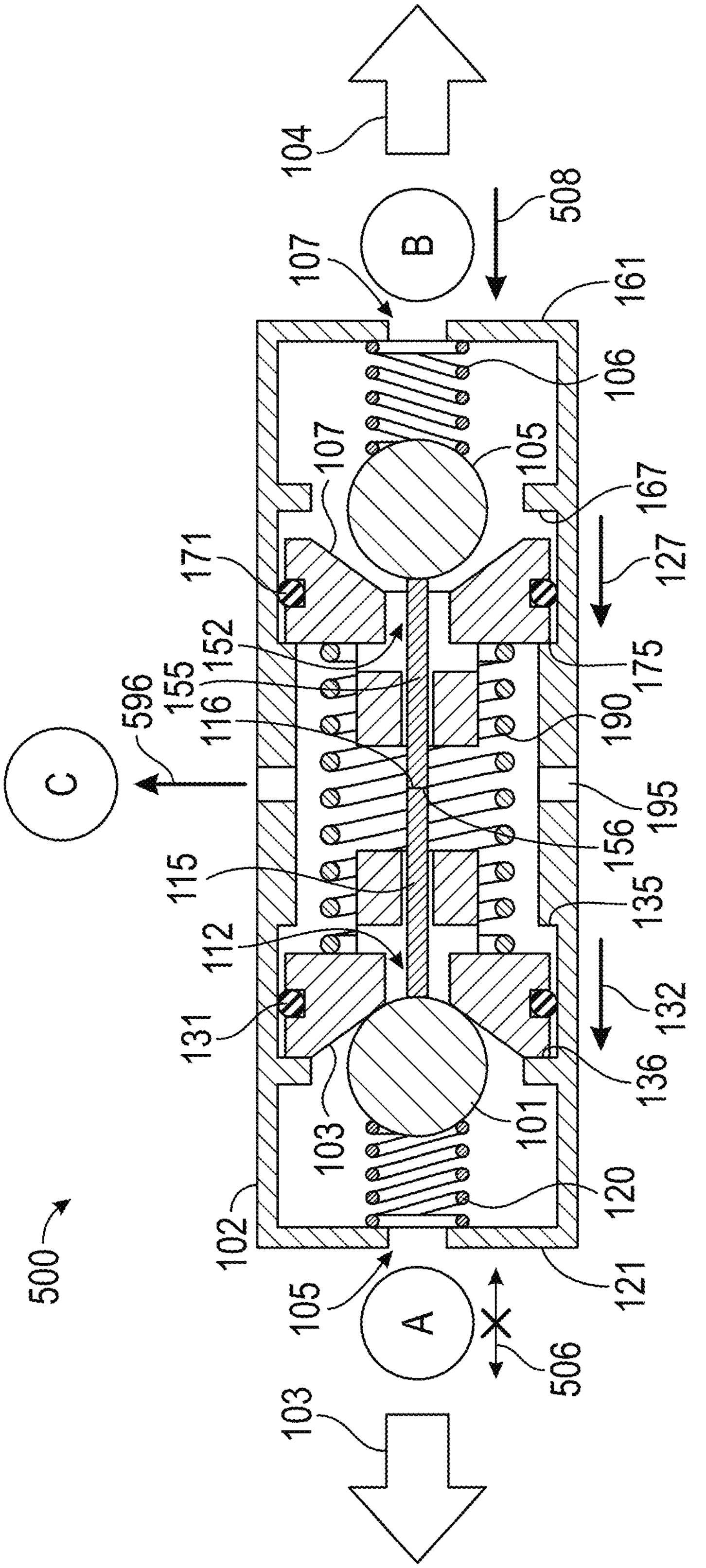
FIG. 5 is a schematic of the double quad valve where FIG. 5 indicates an operation that is essentially a mirror image of the operation described in FIG. 4 where all the same features of the double quad valve [100] are providing essentially the same operation as described for FIG. 4 except that the pressure on Port B ($P_B$) is greater than the pressure on Port C ($P_C$).

FIG. 5 indicates an operation that is essentially a mirror image of the operation described in FIG. 4. Here all the same features of the double quad valve [100] are providing essentially the same operation as described for FIG. 4 except that the pressure on Port B ($P_B$) is greater than the pressure on Port C (Pc). More specifically, FIG. 5 depicts a B>C arrangement [500] scenario where the pressure on Port B [107] ($P_B$) is greater than the pressure on Port C [195] and this pressure differential tends to push the sliding seat [170] towards the center of double quad valve [100] and Port C [195] when the pressure of Port C [195] is decreasing. The pressure on Port B [107] is greater than the pressure on Port C [195], moving the Port B sliding seat [170] to the left to contact the Port B sliding seat inner stop [175]. In this instance, fluid flow through the Port A [105] does not exist as indicated by Port A flow arrow [106].

This feature was not possible in the original flow balancing inverse shuttle valve of U.S. Pat. Nos. 10,598,193, 10,871,174 and 11,326,626, which are hereby incorporated by reference as the mechanical feature of a sliding seat did not exist. The pressure at Port C [195] is decreasing, in FIG. 5, while in FIG. 2 and FIG. 3, the pressure at Port C [195] was increasing. In this instance, the pressure of Port C [195] is decreasing because the well is depressurizing. This is a normal occurrence in wells, and when depressurizing the reservoir, the pump is also locking in the pressures on Port A [105] and Port B [107]. During this operation, the pump is not pumping, there is only a change in hydrostatic pressure that occurs when this operation takes place. In an extreme case of well depressurization, the mechanical components of the pump including the bearings and other sliding surfaces that are inside of the pump as well as additional mechanical components connected to or in the vicinity of the HPU [103,104) could be damaged. In some cases, the well (reference here to an oil and/or gas well) could be depressurized thousands of pounds, and eventually the metal parts inside and exterior to the pump can be damaged. To alleviate this potential damage, the double quad valve [100] was designed to function here as a "reverse pressure relief valve", where the reverse pressure relief occurs through the movement of the sliding seat [170]. As the two cross pressure release rod tips [116, 156] are being pushed together, they can only be pushed together if the sliding seat [170] is moved towards the left, that is towards Port C. As the well is depressurized, the sliding seat [170] starts moving toward the center portion of the double quad valve [100] near the Port C [195] location.

In this instance, there is pressure on Port B [107] while the pressure on Port C [195] is decreasing. The pressure is coming from the Port B connected hydraulic power unit [104] as shown in FIG. 1. The Port B sliding seat [170] of the double quad valve [100] moves towards the center of the double quad valve [100]. The Port A and Port B check elements [110, 150] remain seated in the sliding seats [130, 170]. The amount of movement of the sliding seat [170] is controlled by the balanced pressure spring [190].

Careful adjustment of the dimensions of the double quad valve [500] is required to determine and provide how far the sliding seat [170] can move versus how far apart the cross pressure release rod tips [116,156] of the cross pressure release rods [115,155] of the two check elements [110, 150] can come together without too much or too little space being left between the cross pressure release rod tips [116, 156]. The length of the cross pressure release rods [115, 155] is very critical, as well as the amount of distance that the sliding seat [170] is allowed to move. The Port B sliding seat [170] is only allowed to move a certain distance between the Port B sliding seat inner and outer stops [175, 176]. The Port A sliding seat [130] in this instance does not move. There is more movement available for the sliding seats [130, 170] than there is for the check elements [110, 150] because the cross pressure release rod tips [116, 156] are touching.

The cross pressure release rods [115, 155] are attached onto the check elements [110, 150] in such a way that the cross pressure release rod tips [116, 156] touch before the sliding seat [170] has reached the end of travel. Therefore, as the pressure on Port C [195] is decreasing, the sliding seat [170] along with its check element [150] starts to slide towards the middle of the double quad valve [500] compressing the balanced pressure spring [190]. At some point, the cross pressure release rod tips [116, 156] touch, but the sliding seat [170] continues to slide. As the sliding seat [170] continues to slide, the sliding movement opens up the gap between the check element [150] and the sliding seat [170] and the flow, as indicated by Port B flow arrow [108], moves through the Port B flow passage [152] exiting through Port C [195] as indicated by Port C flow arrow [196]. In this instance the Port A check element [110] remains positioned against the Port A sliding seat [130], and no flow exists in Port A, as indicated by Port A flow arrow [106].

In an additional embodiment of FIG. 5, Port A [105] could be connected to Port C [195], the double quad valve [100] maintains the proper dimensions, so that the Port B sliding seat [170] is going to continue to move and eventually touch the Port B sliding seat inner stop [175]. Because the Port B sliding seat [170] moved and now comes to a rest against the Port B sliding seat inner stop [175], the Port B check element [150] is pushed by the Port B pressure check release spring [160] moving the Port B cross pressure release rod [155] forcing the cross pressure release rod tips [116, 156] to touch each other which lifts the Port B check element [150] away from Port B sliding seat [170]. This opens the Port B flow passage [152] to allow fluid flow into Port B [107] as indicated by Port B flow arrow [108]. Thus, fluid is flowing from Port B [107] through the double quad valve [100] and fluid flow is coming out of Port C [195] as indicated by the Port C flow arrow [196]. In the B>C arrangement [500], the flow path is Port B [107] to Port C [195]), and the double quad valve acts as a pressure relief valve.

Figure 6:
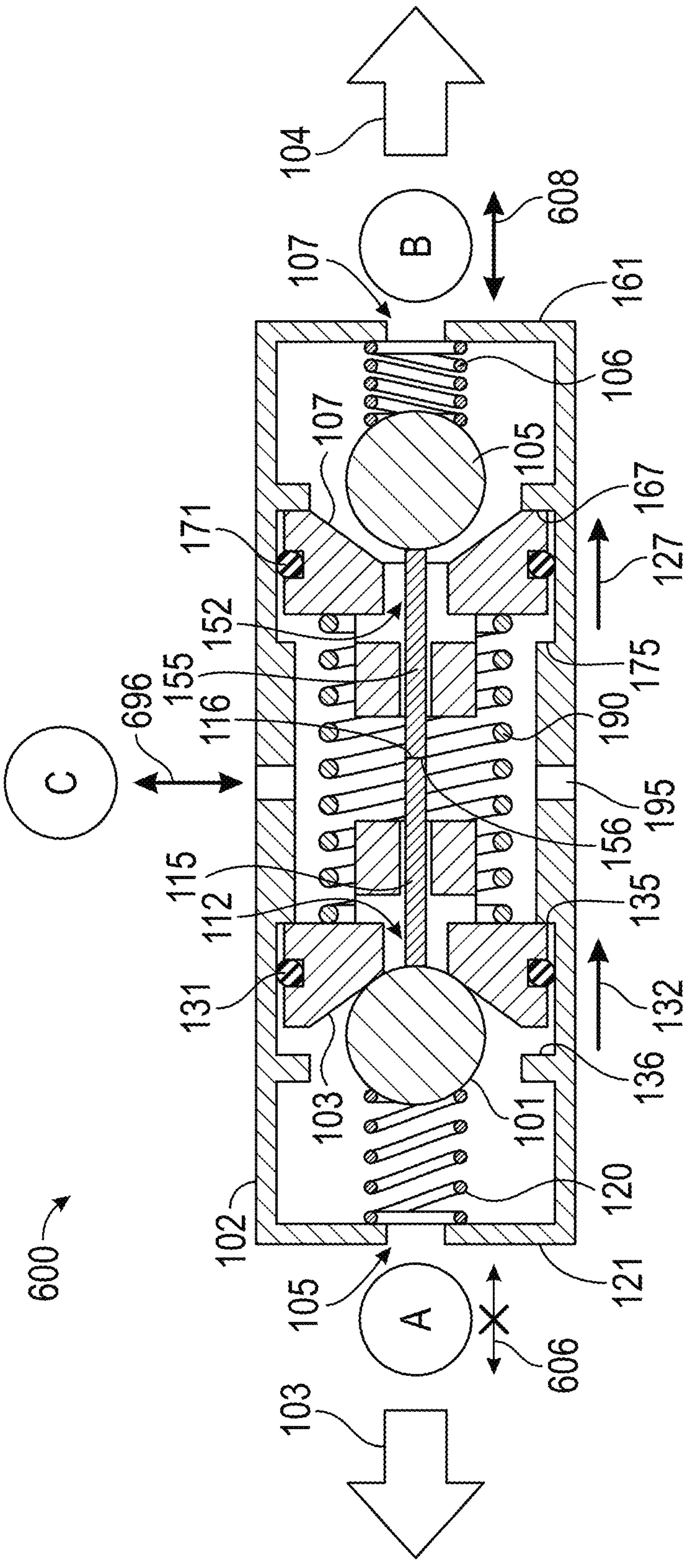
FIG. 6 is a schematic of the double quad valve indicating the ability for bidirectional flow where FIG. 6 provides the A>B arrangement [600] condition where the pressure of Port A [105] ($P_A$) is much larger than the pressure of Port B [107] ($P_B$) ($P_A>P_B$, indicating A>B).

In FIG. 6 the pressure is different between Port A [105] and Port B [107]. FIG. 6 provides the A>B arrangement [600] condition where the pressure of Port A [105] ($P_A$) is much larger than the pressure of Port B [107] ($P_B$) ($P_A > P_B$, indicating A>B). The pressure on Port A [105] is pushing the Port A check element [110] (shown as a ball) and Port A sliding seat [130] in combination together towards the right of the double quad valve [100]. The Port A sliding seat [130] rests against its Port A sliding seat inner stop [135] when the Port A cross pressure release rod tip [116] is pushed against the Port B cross pressure release rod tip [156]. This motion lifts the Port B check element [150] off the Port B sliding seat [170]. This allows for opening of the Port B flow passage [152] so that bi-directional flow can occur between Port B [107] and Port C [195]. The bidirectional Port B flow arrow [108] and Port C flow arrow [196] illustrate this bi-directional flow. Here the Port A and Port B cross pressure release rods [115, 155] provide the correct length to push the Port B check element [150] out of the Port B sliding seat [170]. When this overall movement occurs, the Port B sliding seat [170] is extended all the way to the right, touching the Port B sliding seat outer stop [176]. In this instance no fluid flow exists through Port A [105] as indicated by Port A flow arrow [106].

In the A>B arrangement [600], the flow path is bidirectional between Port B [107] and Port C [195], and the double quad valve [100] acts as a cross pressure acting (between port A and port B) bidirectional flow valve.

Figure 7:
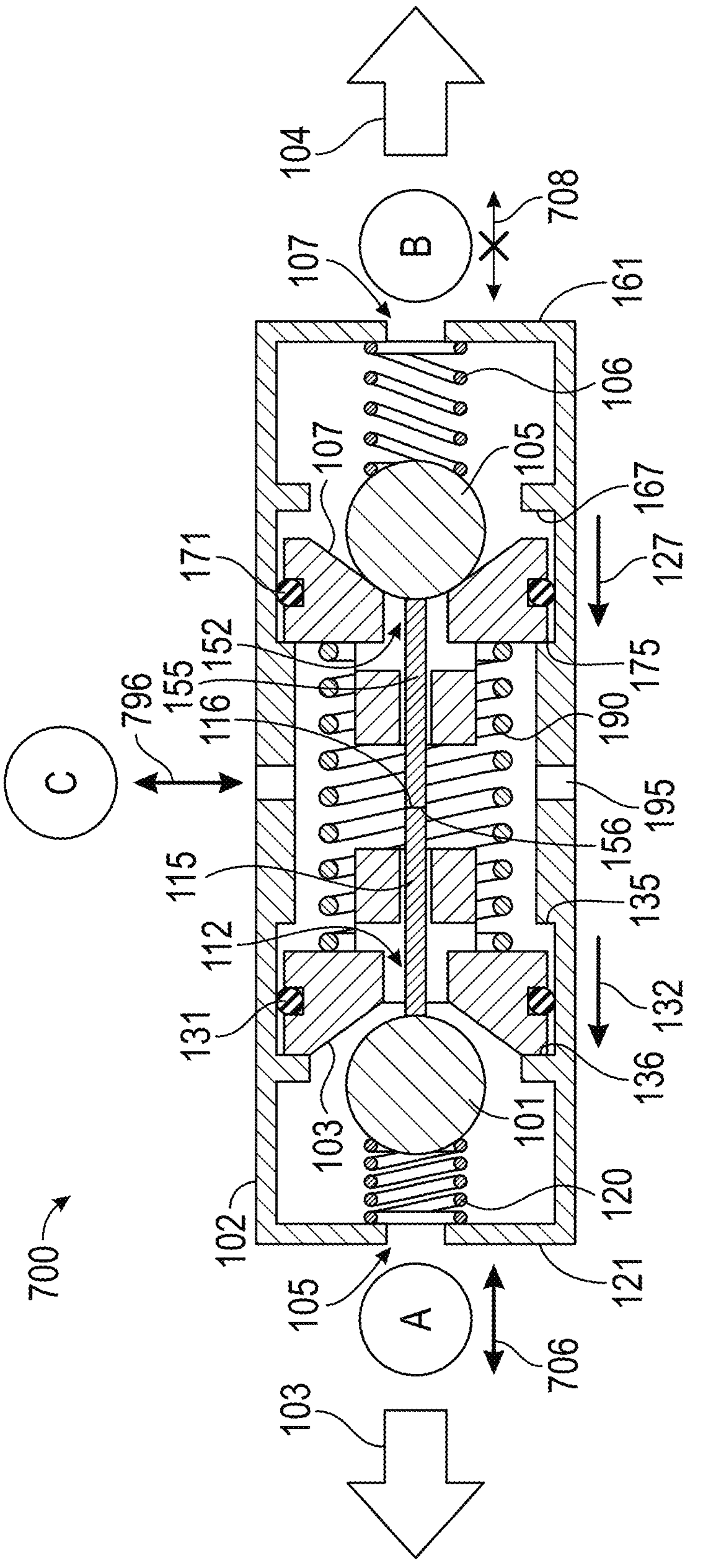
FIG. 7 is a schematic of the double quad valve where FIG. 7 provides the B>A arrangement [700] condition where the pressure of Port B [107] ($P_B$) is much larger than the pressure of Port A [105] ($P_A$).

FIG. 7 provides the B>A arrangement [700] condition where the pressure of Port B [107] ($P_B$) is much larger than the pressure of Port A [105] ($P_A$). ($P_B > P_A$, indicating B>A). The pressure on Port B [107] is pushing the Port B check element [150] and Port B sliding seat [170] in combination together towards the left of the double quad valve [100]. The Port B sliding seat [170] rests against its Port B sliding seat inner stop [175] when the Port B cross pressure release rod tip [156] is pushed against the Port A cross pressure rod tip [116]. This motion lifts the Port A check element [110] off the Port A sliding seat [130]. This allows for opening of the Port A flow passage [112] so that bi-directional flow can occur between Port A [105] and Port C [195]. The bidirectional Port A flow arrow [106] and Port C flow arrow [196] illustrate this bi-directional flow. Here the Port A and Port B cross pressure release rods [115,155] provide the correct length to push the Port A check element [110] out of the Port A sliding seat [130]. When this overall movement occurs, the Port A sliding seat [130] is extended all the way to the left, touching the Port A sliding seat outer stop [136]. In this instance no fluid flow exists through Port B [107] as indicated by the Port B flow arrow [108].

In the B>A arrangement [700], the flow path is bidirectional between Port A [105] and Port C [195], and the double quad valve acts as a cross pressure acting (between port A and port B) bidirectional flow valve.

There are at least two conditions where the fluid flow can simultaneously flow in three separate directions. Specifically, one condition allows for the fluid flow to flow into Port C [195] and simultaneously through and out of Port A [105] and Port B [107] which is a combination of the fluid flow conditions described and shown in FIG. 2 and FIG. 3. A second condition is when the fluid flow can simultaneously flow into Port A [105] and Port B [107] and out of Port C [195] which is a combination of the fluid flow conditions described and shown in FIG. 4 and FIG. 5.

Figure 8:
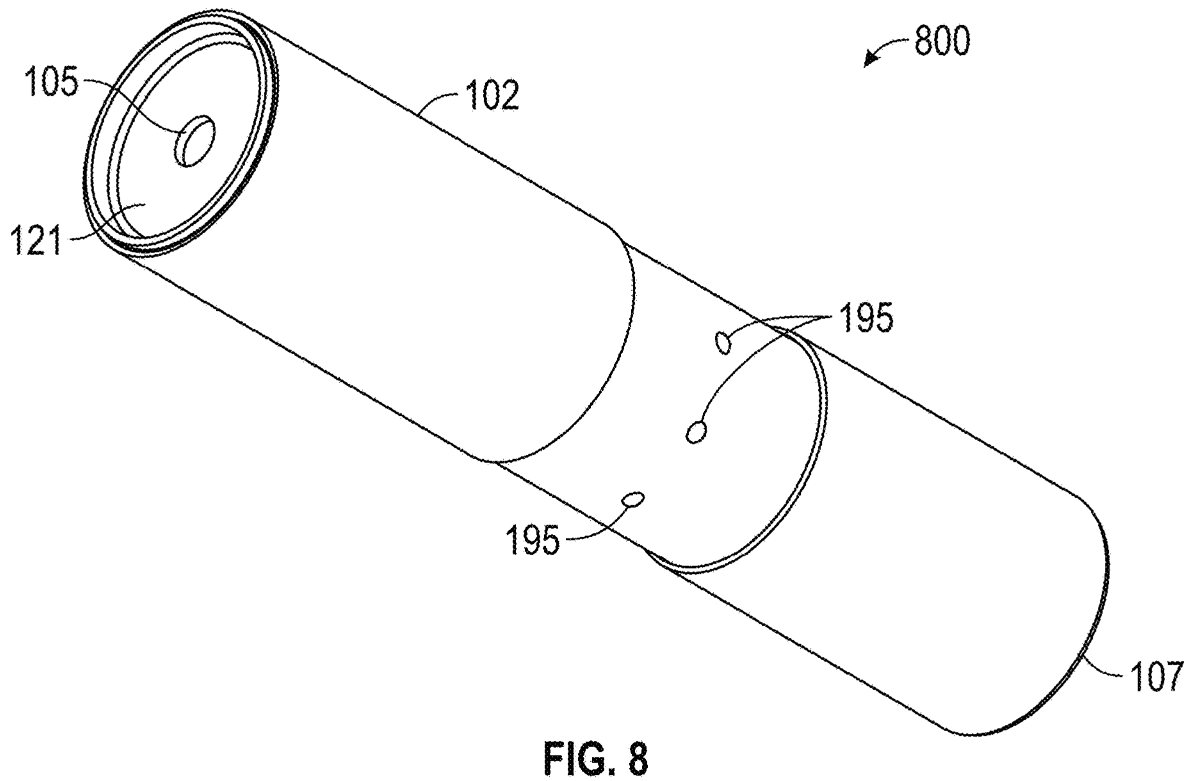
FIG. 8 is a schematic of the double quad valve where a three-dimensional perspective view of FIG. 1 illustrates one embodiment of the double quad valve [100] that represents a cylindrical shaped valve body [102] of the double quad valve.

FIG. 8 is a three-dimensional perspective view of FIG. 1 that illustrates one embodiment of the double quad valve [100] that represents a cylindrical shaped valve body [102] of the double quad valve. Here Port A [105] and the location of Port B [107] and multiple Port Cs [195] and an end portion partial view of the Port A pressure check release spring support [121] are shown. The purpose of the use of multiple Port Cs [195] is for uniform distribution around the circumference of the double quad valve [100] for the fluid flow into and out of the multiple Port Cs [195].

Figure 9:
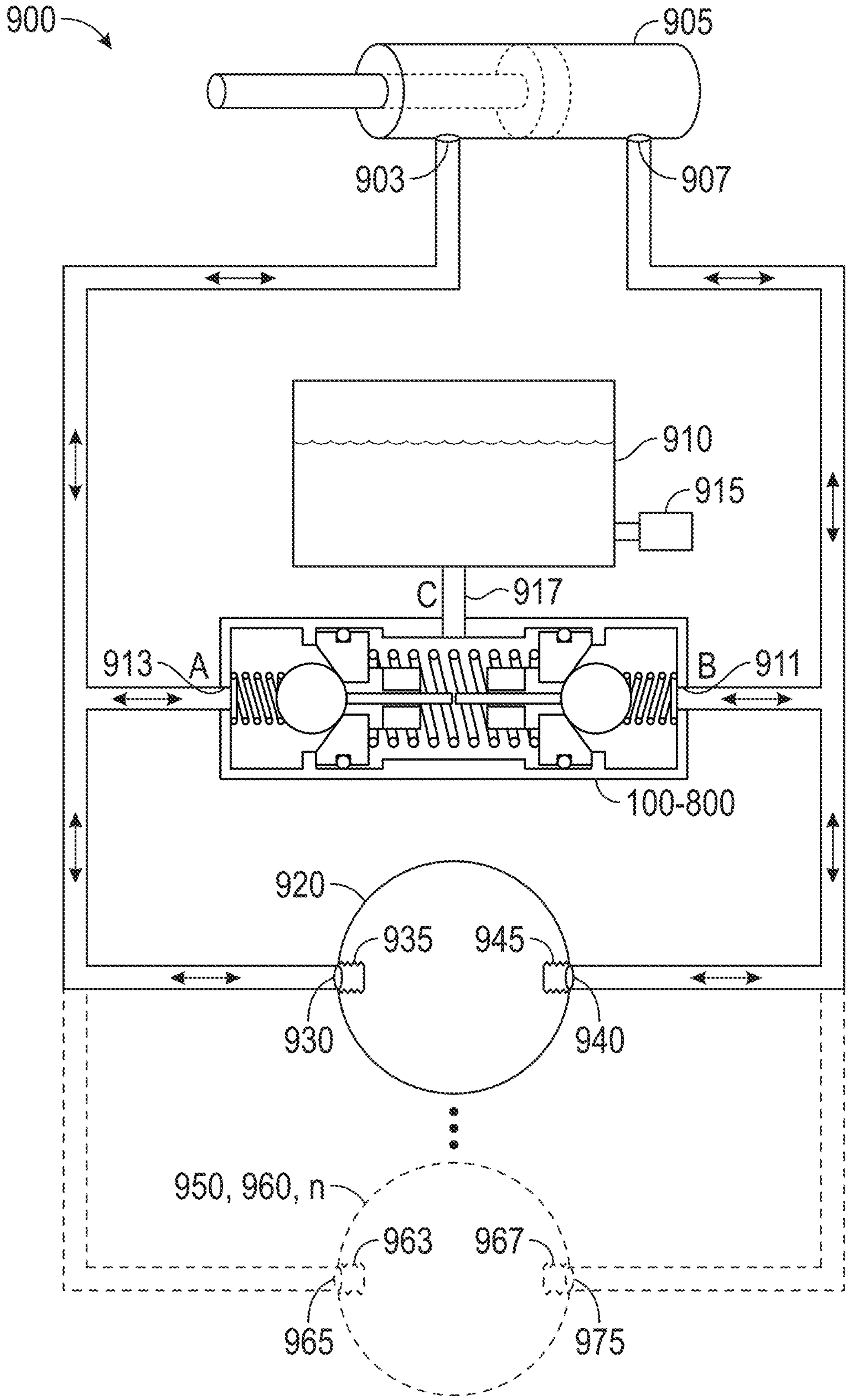
FIG. 9 is a schematic of the use of the double quad valve complete with a variable fluid reservoir that utilizes a fluid flow path, an actuator with upper bidirectional ports, a controller, and one or more pumps that include both pump inlet and outlet ports with motor seals.

FIG. 9 is a schematic representation (900) of the use of the bidirectional quad valve (shown in FIGS. 1-8 as 100, 200,300,400,500,600,700, and 800) which includes an actuator (905) with upper (and lower in some cases) that is attached to a variable fluid reservoir (910) that includes a controller (915) which is in fluid flow contact the variable fluid reservoir (910). The bidirectional quad valve also includes either first, second or third inlet and outlets ports (911, 913, 917) to ensure bidirectional fluid flow into and out of these inlet and outlet ports (911,913, 917) and ensure the fluid flow reaches the actuator. The fluid can be pumped by a single pump or motor (920) that includes at least two pump ports (930, 940) that also utilize motor seal ports (935, 945). It is also possible that multiple pumps can be utilized as shown (950,960 . . . n pumps) that also utilize at least two pump ports (965,975) and corresponding motor seals (963, 967).

We claim:

1. A double quad valve that balances fluid flow as it actuates and moves one or more mechanical, hydraulic, electro-mechanical, and/or electro-hydraulic devices, wherein said double quad valve manages and controls said fluid flow so that said fluid flow flows in a single, bi-directional and/or tri directional direction as required, and wherein said double quad valve possesses at least three ports and is connected to a variable fluid reservoir;

a first port of said three ports is located on an inlet side of said double quad valve, a second port is located on an outlet side of said double quad valve and;

a third of said three ports is located between said inlet side and said outlet side of said double quad valve such that said third port connects to a variable fluid reservoir between said first port and second port and;

wherein said fluid flow is controlled when fluid flows though said double quad valve by use of at least one set of three ports wherein said double quad valve further comprises; at least three springs and two moving seats that provide for complete closure and sealing of all ports of said double quad valve wherein said moving seats comprise sliding seats that allow for seating in outer positions of said double quad valve so that said sliding seats can rest on sliding seat outer stops wherein said port remains in fluid communication with said variable fluid reservoir during operation and wherein said double quad valve comprises check elements positioned at said first port and second port that are seated and rest on said sliding wherein said check elements are controlled by pressure relief springs wherein said double quad valve comprises three springs: a first pressure relief spring at said first port, a second pressure relief spring at second port, and a balanced pressure spring between said sliding seats such that said first port also is equipped with said pressure relief spring that allows for push of said first port check element so that said sliding seat is pushed toward a center of said valve in order to just come in contact with a first port sliding seat and wherein said second port sliding seat is equipped with said second pressure relief spring that allows for push by said second port check element so that said sliding seat is pushed away from said center of said valve to just come in contact with said second port sliding seat so that both sliding seats just come in contact in a position that provides a force necessary to push both sliding seats far enough to just contact a set of inner stops so that when said double quad valve is in a static fluid normal/neutral state and associated position provided by a balanced pressure spring that pushes said both sliding seats away from each other to contact sliding seat outer stops so that a middle portion of said double quad valve that also functions as a fluid and/or well reservoir thereby ensuring a complete absence of fluid flow that can flow between any of said three ports.

2. The double quad valve of claim 1, wherein to achieve said complete absence of fluid flow seated check elements that can be in a form of spherical balls maintain a position in coordination with said sliding seats outer stops and wherein a balanced pressure spring provides a spring K factor of at least twice that of two pressure relief check springs that exist within ports of both said inlet side and said outlet side.

3. The double quad valve of claim 2, wherein said balanced pressure spring pushes said sliding seats toward said sliding seats outer stops that results in pushing a first port sliding seat as far to away from said center of said valve position as possible due to geometric mechanical constraints of said double quad valve and a second port sliding seat to as far to toward said center of said valve position as possible due to said geometric mechanical constraints of said double quad valve.

4. The double quad valve of claim 3, wherein said quad valve design functions as a reverse pressure relief valve wherein reverse pressure relief occurs via movement of said sliding seats and wherein two cross pressure release tips connected to said sliding seats are pushed together only if and when said sliding seats are in motion.

5. The double quad valve of claim 4, wherein said fluid reservoir and/or well is depressurized when said sliding seats are set in motion toward each other.

6. The double quad valve of claim 4, wherein said quad valve controls fluid flow into and out of at least one variable fluid reservoir.

7. The double quad valve of claim 4, wherein said at least one variable fluid reservoir is vented, sealed, pressure compensated, preloaded and/or expandable.

8. The double quad valve of claim 4, wherein said inlet and said outlet port(s) open and close as required to ensure balanced fluid flow along said flow path with a required force and direction to move said mechanical, hydraulic, electro-mechanical, and/or electro-hydraulic device(s) actuated by an actuator in a precise and controlled manner as needed.

9. The double quad valve of claim 8, wherein fluid is delivered to at least one port of said actuator via an hydraulic circuit and fluid flow along said flow path from one or more pumps located on either or both sides of said inlet and outlet port(s) is blocked, redirected, or continues to flow into one or more additional control valves, said additional control valves include components that control fluid flow returning from said actuator back into said one or more pumps, thereby completing a flow of fluid along said flow path and accomplishing an ability to control intermittent or continuous movement of said mechanical, hydraulic, electro-mechanical, and/or electro-hydraulic devices.

10. The quad valve of claim 8, wherein said at least one hydraulic circuit can also be powered by electrical power that actuates and moves said one or more pumps in either a single or bi-directional direction wherein electric power units are selected from a group consisting of motors, engines, turbines and inverters.

11. The double quad valve of claim 8, wherein fluid flow along said flow path continues flowing into and out of said one or more pumps thereby keeping one or more motor seal ports and associated pump ports filled with fluid, thereby reducing or eliminating hydraulic lock and cavitation of said one or more pumps.

12. The double quad valve of claim 8, wherein said at least one hydraulic circuit also includes a pressure compensator tank that is operationally connected to said at least one pump inlet port of said one or more pumps through a fluid flow filter and wherein said compensator tank is a portion of a variable fluid reservoir.

13. The double quad valve of claim 8, wherein said one or more pumps are a motor.

14. The double quad valve of claim 8, wherein said variable fluid reservoir includes at least one compensator tank and a port to ambient pressure and a reservoir pressure measuring device that measures ambient pressure and ensures an ability to operate even with an existence of unbalanced flow to and from said actuator within or adjacent to said hydraulic circuit and wherein said variable fluid reservoir allows for thermal expansion or compression within said system.

* * * * *